United States Patent [19]

Lustenberger

[11] Patent Number: 4,680,976
[45] Date of Patent: Jul. 21, 1987

[54] TORQUE OR ANGLE OF TORSION MEASURING DEVICE

[75] Inventor: Martin Lustenberger, Fribourg, Switzerland

[73] Assignee: Vibro-Meter SA, Fribourg, Switzerland

[21] Appl. No.: 798,674

[22] Filed: Nov. 15, 1985

[51] Int. Cl.$^4$ ............................................. G01B 7/14
[52] U.S. Cl. ............................... 73/862.33; 324/208; 336/30
[58] Field of Search ............ 73/862.33, 862.34, 862.36; 324/208; 336/30, 79, 87, 135

[56] References Cited

U.S. PATENT DOCUMENTS 3,329,012  7/1967  Demuth.
4,356,732  11/1982  Hachtel et al.

FOREIGN PATENT DOCUMENTS 2118722  4/1971  Fed. Rep. of Germany ... 73/862.33
3307105  11/1983  Fed. Rep. of Germany.
2404201  4/1979  France.
2421365  10/1979  France.
2097131  10/1982  United Kingdom.

OTHER PUBLICATIONS

A. T. Artamonov et al., "Converter of . . . Digital Code", *Measurement Techniques*, vol. 21, No. 7 pp. 930–934 (Plenum 1978).

*Primary Examiner*—Charles A. Ruehl
*Attorney, Agent, or Firm*—Marks Murase & White

[57] ABSTRACT

The device comprises a shaft to which is applied a torque to be measured. The shaft is mounted in two ball bearings which are secured in a pair of supports coupled by a cylindrical metallic piece forming a shield against electromagnetic influences from the outside. Concentric disks facing each other and at close proximity from each other are secured by means of connecting tubes respectively to each extremity of the shaft. Each disk comprises non transparent sectors for electromagnetic waves separated by transparent sectors, the sectors being arranged in a regular angular configuration on the disks. The relative angular position of the disks is such that in the absence of a torque applied to the shaft, the non transparent sectors of one disk and the transparent sectors of the other disk overlap. The disks form a shielding element the effect of which being variable in dependence on their relative angular position. Transmitting and receiving coils separated by the disks are provided in the supports at close proximity of the disks. The transmitting coil receives a constant high frequency current from a generator and the signal induced in the receiving coil is detected, this signal being dependent on the variable shielding effect of the disks.

9 Claims, 6 Drawing Figures

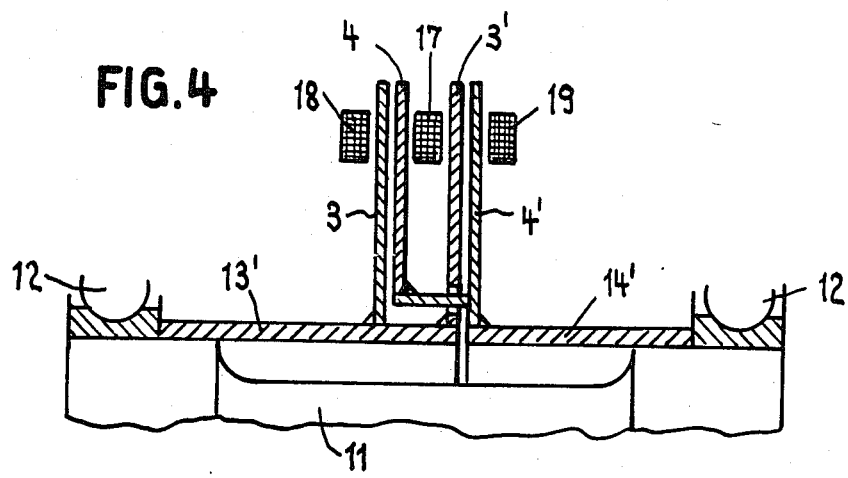
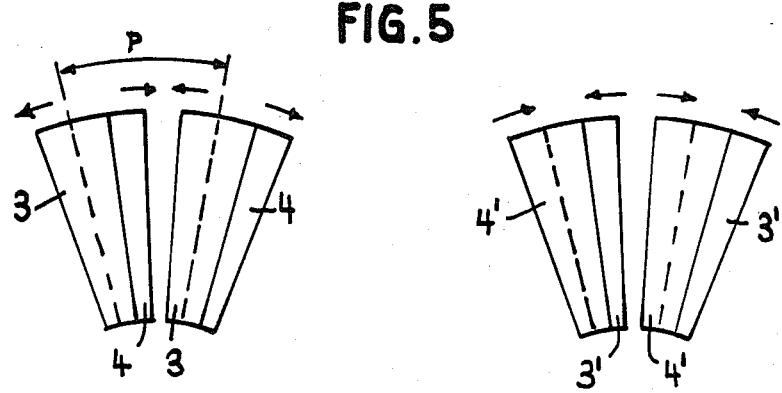
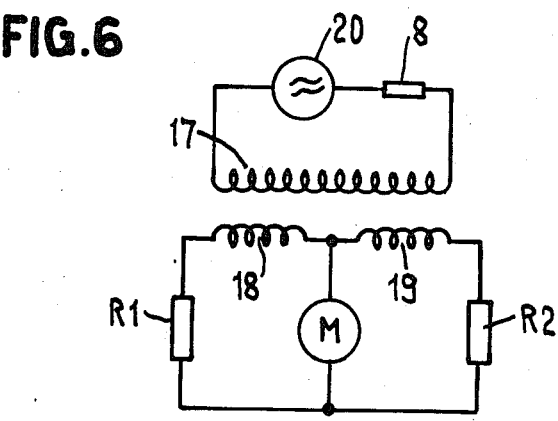

TORQUE OR ANGLE OF TORSION MEASURING DEVICE

BACKGROUND OF THE INVENTION

The present invention relates to a torque or angle of torsion measuring device with at least one pair of screening elements facing each other and concentrically arranged about a torque transmitting shaft, each element comprising a plurality of conductive zones, one of the elements of said pair being coupled to an end of the shaft, the other element being coupled to the other end of said shaft and at least two coils concentric to the shaft being provided in the vicinity of said elements and separated by these elements.

Such a device for converting an angle of torsion of a shaft into a digital code is known from the publication "Measurement Technique", Vol. 21, No. 7, July 1978, New York (U.S.), p. 930–934. However, the screening elements of the pair are provided with a different number of conductive zones and the device operates in accordance with the principle of the displacement of moiré fringes for producing a digital output signal.

The patent GB No. 2 097 131 discloses a torque transducer comprising two pairs of wings, the wings of each pair facing each other and having a determined relative angular shift. The two pairs of wings permit a differential measurement. To each pair of wings is associated a coil in intimate contact with one of these wings. However, the relative angular shift of the wings of a pair causes a variation of the impedance of the associated coil such that in spite of the differential effect, the precision of the measurement is limited.

Further, there is known from the U.S. Pat. No. 4,356,732 a device in which the zones of the two elements are in alignment for a given initial torque. The coils are supplied with a high frequency signal and they induce eddy currents in the conductive zones of the elements. The energy which is necessary for creating these eddy currents is delivered by the coils which in turn produces a change of the impedance of these coils. The establishment of the eddy currents is in turn influenced by the relative angular shift of the elements when a torque is applied to the shaft, that is by the opening or closing of the non conductive regions between the conductive zones of the elements. Thus, the measurement of the variation of impedance of the coils permits to determine the relative angular shift of the elements and thus the torque applied to the shaft. However, like in the preceding case, in such a device, the precision of the measurement is limited because of the relatively weak variation of impedance of the coils, even for an angle of torsion as high as e.g. 20° C. Further, the coils are sensitive to the variations of temperature so that the variation of impedance caused by the relative angular shift of the elements depends also on the temperature.

SUMMARY OF THE INVENTION

It is therefore an object of the present invention to realize a torque or angle of torsion measuring device which does not present the above mentioned disadvantages and which is of relatively simple electric construction. For solving this problem, the device according to the invention is characterized in that one of the coils is a transmitting coil, at least one other coil being a receiving coil for delivering a signal having an amplitude which depends on the relative angular shift of the screening elements when a torque is applied to the shaft. Because the device comprises a transmitting coil and one or more receiving coils separated by variable shielding elements, the signal from the transmitting coil is transmitted inductively to at least one receiving coil. The pair of shielding elements arranged between the transmitting and the receiving coil behaves like a shield the shielding effect of which is variable according to the relative angular shift between the elements. The preceding shows that the device according to the invention does not operate on the principle of creating eddy currents causing a variation of impedance of a coil. The transmitting coil is supplied by a constant high frequency current so that the temperature has no effect on the measurement. Likewise, the receiving coil is connected into a high impedance rectifier circuit delivering a signal which is practically independent from the temperature. This ensures an excellent temperature stability of the device, even without any differential arrangement. Moreover, the useful output signal of the device is not simply a relatively weak variation of a basis signal but a signal which varies within a large domain, i.e. of a factor of 1 to 10 between a relative position of the screening elements such that the transparent regions between the conductive, opaque zones of one element are covered by the conductive, opaque zones of the other element and a relative position of the screening elements such that the conductive, opaque zones of both elements overlap. Thus, the useful signal delivered by the device varies over a large range and it can reach high values.

BRIEF DESCRIPTION OF THE DRAWINGS

FIG. 4 shows schematically an arrangement of the device permitting a differential measurement, FIG. 5 shows the relations between the relative angular positions of the sectors of the disks of the device of FIG. 4, and FIG. 6 shows the connection of the coils of the device of FIG. 4.

FIG. 1 shows the principle of the device which comprises a set of coils T with a transmitting coil 1 and a receiving coil 2. The coils are separated by disks 3 and 4 facing each other and arranged at a small distance from each other. One of the disks is coupled to one extremity of a shaft which transmits a torsion couple to be measured and the other disk is coupled to the other extremity of this same shaft. Each disk comprises a plurality of conductive sectors 5 non transparent for electromagnetic waves separated by transparent sectors 6. These sectors are arranged according to a regular configuration on the internal face of the disks as shown in FIG. 3. The sectors may form a moiré pattern on the disk. In the example of FIG. 1, the arrangement of the disks is such that in the absence of any torque acting on the shaft, the non transparent sectors 5 of one disk and the transparent sectors 6 of the other disk overlap. In this case, the shielding effect of the set T is maximum and the signal transmitted to the receiving coil 2 is minimum. The transmitting coil 1 is supplied by a high frequency generator 7 through a resistor 8 of high value such that the coil 1 is practically supplied by a constant high frequency current. Consequently, the current in the transmitting coil is not influenced by the variations of this coil as a function of the temperature and the electromagnetic field transmitted to the receiving coil is independent of the temperature. The receiving coil is connected by a resistor 9 of high value to a conventional detector circuit 10. The detector circuit has a high impedance and the intrinsic relatively weak variation of the receiving coil 2 as a function of the temperature has no practical influence on the signal at the output of the detector.

FIG. 2 shows an example of execution of the device of FIG. 1. The device comprises a torsion shaft 11 with a ball bearing 12 at each extremity. The torsion couple to be transmitted and measured is applied at one extremity of the shaft, i.e. at Me and it is transmitted to the other extremity at Ms. The disks 3 and 4 are secured respectively on connecting tubes 13 and 14, the tube 13 is secured at the torque receiving extremity Me of the shaft 11 and the tube 14 at the torque delivering extremity Ms of the same shaft. The ball bearings 12 which support the shaft 11 are mounted in a support having two parts 15A, 15B of insulating material. These parts 15A, 15B are coupled by means of a cylindrical metallic piece 16 forming shielding against the external electromagnetic influences. The transmitting coil 1 is mounted in a recess of the internal lateral side of the support 15A, in front and at close proximity to the disk 3, the central radius of the coil corresponding to the central radius of the disk. The receiving coil 2 is mounted in a recess of the internal lateral side of the support 15B, in front and at close proximity to the disk 4. The coils 1 and 2 are facing each other and they are centered on the shaft 11 as well as the disks 3 and 4. The whole is mounted in a frame not represented. The configuration of the device according to FIGS. 1 and 2 is stable with respect to the influences from the environment. The important criterions for the design of the shaft 11 are the stiffness and the permissible load. A relative twist of 0.5° under normal load represents a good compromise between a great stiffness, that is a small oscillation of torsion of the whole, and a sufficient output signal. By increasing the number of the sectors of the disks, it is in principle possible to obtain a usable output signal for an smaller angular shifting.

FIG. 4 shows an example of execution of the device which permits a differential measurement of the torque or the angle of torsion. Such a measurement permits to improve the temperature stability and the stability with respect to the constraints from the environment. In this case, two pairs of sectors comprising disks 3,4 and 3',4' are provided. The disks 3 and 3' are coupled to the torque receiving extremity Me of the shaft 11 by means of a connecting tube 13' and the disks 4 and 4' are coupled to the torque delivering extremity Ms of the shaft 11 by means of a connecting tube 14'. A transmitting coil 17 is mounted in the centre, between the pairs of disks 3,4 and 3',4'. Receiving coils 18 and 19 are mounted opposite to the transmitting coil, at the external side of the disks 3 and 4'. The coils 17, 18 and 19 are concentric to the shaft 11. FIG. 5 shows that the sectors of the disks 3 and 4 are mutually shifted of a quarter of a pitch p as well as the sectors of the disks 3' and 4'. Likewise, the sectors of the disks 3 and 3' and the sectors of the disks 4 and 4' are mutually shifted of a quarter of pitch. Under these conditions and when a torque is applied to the shaft 11, the relative angular displacements of the sectors of the pairs of disks, represented by arrows, are such that the sectors of the disks 3 and 4 move away from each other while the sectors of the disks 3' and 4' draw nearer to each other, and inversely if the torque is applied in the other direction. FIG. 6 shows the bridge circuit utilized for the differential measurement. The receiving coils 18 and 19 form a measuring bridge with the resistors R1 and R2, an measuring instrument M being connected in the diagonal of the bridge. A high frequency signal generator 20 feeds the transmitting coil 17 through a resistor 8 of high value.

Figure 1:
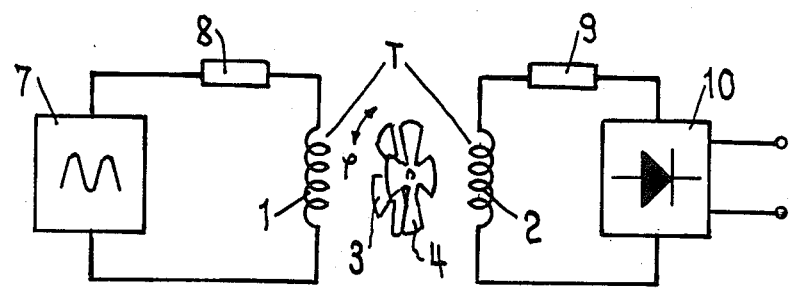
FIG. 1 shows a diagram illustrating the principle of the device.
Figure 2:
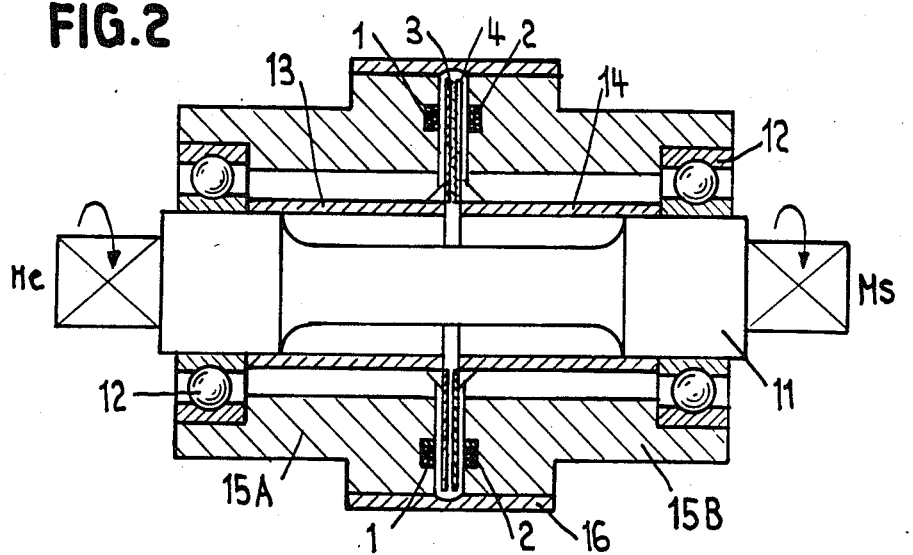
FIG. 2 shows an embodiment of the device of FIG. 1.
Figure 3:
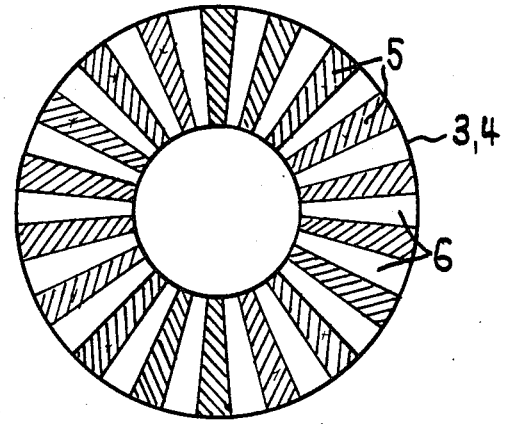
FIG. 3 shows a form of execution of the disks of the device of FIG. 1.

It is to be seen from the preceding that the device according to the invention is of simple design and that it has the advantage of being particularly stable with respect to the temperature and to be protected against the influences from the environment. It delivers a usable output signal the value of which being variable within a large domain.

I claim:

1. A torque or angle of torsion measuring device comprising:

a shaft for receiving and transmitting a torque to be measured;

at least one pair of disk-shaped shielding elements facing each other, arranged concentrically to said shaft and connected respectively to opposite extremities of said shaft, each of said shielding elements comprising a plurality of electrically conductive zones separated by identical electrically nonconductive zones, the number of said zones being the same on both shielding elements, said zones extending between an outer and an inner diameter of said shielding elements which are mutually angularly shifted in response to said torque for providing a variable electromagnetic shielding; and at least two coils of same middle diameter arranged concentrically to said shaft and located at either side of said pair of shielding elements, at close proximity thereto, one of said coils being an electromagnetic signal transmitting coil and the other coil a receiving coil for said signal, said receiving coil delivering an output signal having an amplitude depending on said mutual angular shift of said shielding elements.

2. A device according to claim 1, wherein said electrically conductive zones are opaque for said electromagnetic signal and said nonconductive zones are transparent for said electromagnetic signal, said zones being arranged in a regular configuration on an internal face of said shielding elements, said opaque zones of one of said shielding elements and said transparent zones of the other shielding element overlapping in the absence of a torque applied to said shaft.

3. A device according to claim 2, wherein said zones are sectors.

4. A device according to claim 1, wherein said transmitting coil is fed by a generator of constant high frequency current.

5. A device according to claim 1, wherein said receiving coil is connected to a detector circuit comprising a rectifier.

6. A torque or angle of torsion measuring device comprising:

a shaft provided with bearings at its extremities for receiving and transmitting a torque to be measured;

at least one pair of shielding elements facing each other and arranged concentrically to said shaft, said shielding elements being connected by coupling means respectively to opposite extremities of said shaft, said bearings being secured in supports separated by said shielding elements and coupled together by a cylindrical conductive piece acting as a shield against the external electromagnetic influences, each of said shielding elements comprising a plurality of electrically conductive zones separated by nonconductive zones and being mutually angularly shifted in response to said torque for providing a variable electromagnetic shielding; and at least two coils facing each other, arranged concentrically to said shaft and being mounted in recesses on the internal lateral sides of said supports, on opposite sides of said pair of shielding elements and at close proximity thereto, one of said coils being an electromagnetic signal transmitting coil and the other coil a receiving coil for said electromagnetic signal, said receiving coil delivering an output signal having an amplitude depending on said variable electromagnetic shielding.

7. A torque or angle of torsion measuring device comprising:

a shaft for receiving and transmitting a torque to be measured;

two pairs of shielding elements, each pair comprising first and second shielding elements facing each other and arranged concentrically to said shaft, each of said shielding elements comprising a plurality of electrically conductive zones separated by nonconductive zones, said first elements of each pair being coupled to one extremity of said shaft, said second elements of each pair being coupled to the other extremity of said shaft, said first and second shielding elements being mutually angularly shifted in response to said torque for providing a variable electromagnetic shielding;

said pairs of shielding elements being respectively arranged on opposite sides of a transmitting coil and separating receiving coils arranged opposite said transmitting coil respectively on the external side of each pair of shielding elements, said receiving coils delivering an output signal having an amplitude depending on said variable electromagnetic shielding, said pairs of shielding elements and said coils permitting a differential measurement of said mutual angular shift between said first and second shielding elements in response to said torque.

8. A device according to claim 7 wherein, in the absence of said torque, said zones of said first and second shielding elements of each pair are mutually angularly shifted by a quarter of a pitch between said zones, said zones of said elements of the first pair being angularly shifted by a quarter of said pitch with respect to said zones of said elements of said second pair.

9. A device according to claim 7, wherein said transmitting coil is fed by a generator of constant high frequency current, said receiving coils forming two branches of a measuring bridge.

* * * * *